United States Patent
Su et al.

(10) Patent No.: US 12,556,402 B2
(45) Date of Patent: Feb. 17, 2026

(54) AI-GENERATED CONTENT DETECTION

(71) Applicant: International Business Machines Corporation, Armonk, NY (US)

(72) Inventors: Jun Su, Beijing (CN); Yang Liang, Beijing (CN); Su Liu, Austin, TX (US); Jennifer Sparks, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 18/235,357

(22) Filed: Aug. 18, 2023

(65) Prior Publication Data

US 2025/0062909 A1    Feb. 20, 2025

(51) Int. Cl.
    *H04L 9/32*    (2006.01)
(52) U.S. Cl.
    CPC .................. *H04L 9/3247* (2013.01)
(58) Field of Classification Search
    None
    See application file for complete search history.

(56) References Cited

U.S. PATENT DOCUMENTS

| | | | |
|---|---|---|---|
| 7,738,658 B2 | 6/2010 | Brundage et al. | |
| 9,055,239 B2 | 6/2015 | Tehranchi et al. | |
| 2018/0024972 A1 | 1/2018 | Gosukonda et al. | |
| 2018/0150752 A1* | 5/2018 | Henderson | G06N 20/00 |
| 2021/0165860 A1 | 6/2021 | Perez Freire et al. | |
| 2021/0233204 A1* | 7/2021 | Alattar | G10L 19/018 |
| 2023/0109734 A1 | 4/2023 | Galle et al. | |

FOREIGN PATENT DOCUMENTS

WO    2025/040971 A1    2/2025

OTHER PUBLICATIONS

Heikkilä, M., "A Watermark for Chatbots Can Expose Text Written by an AI," MIT Technology Review, Jan. 27, 2023.
Kirchenbauer, K., et al., "A Watermark for Large Language Models," arXiv:2301.10226, Jan. 24, 2023.
"AI Detector," available at https://contentatscale.ai/ai-content-detector/, last accessed on Aug. 17, 2023.

(Continued)

*Primary Examiner* — Jeffrey C Pwu
*Assistant Examiner* — Mayasa A. Shaawat
(74) *Attorney, Agent, or Firm* — Stosch Sabo

(57) ABSTRACT

A method for detecting content generated by artificial intelligence is disclosed. In one embodiment, such a method includes monitoring interaction between a user and a generative AI model. The method intercepts a response returned from the generative AI model to the user and embeds, within the response prior to its return to the user, codes that are invisible to the user when viewing the response. In certain embodiments, these codes are embedded within the response in a particular invisible code insertion pattern to indicate that the response was generated by the generative AI model. The method returns the response to the user for viewing. A third party may utilize the embedded codes to determine whether the response was generated by the generative AI model. A corresponding system and computer program product are also disclosed herein.

20 Claims, 9 Drawing Sheets

(56) References Cited

OTHER PUBLICATIONS

Puiu, T., "Can Digital Watermarks Prevent AI-generated Plagiarism?," ZME Science, Dec. 14, 2022.
Mitchell, E., et al., "DetectGPT: Zero-Shot Machine-Generated Text Detection using Probability Curvature," 2023 arXiv v1, Jan. 2023.
Montti, R., "How the Chatgpt Watermark Works and Why It Could Be Defeated," Search Engine Journal, Dec. 30, 2022.
Karhade, M., "OpenAI is Adding Watermark to GPT: No More Plagiarizing," Towards AI, Dec. 10, 2022.
"Steganography and Digital Watermarking," From Computing and Software Wiki, available at http://wiki.cas.mcmaster.ca/index.php/Steganography_and_Digital_Watermarking, last accessed Aug. 17, 2023.
International Searching Authority, "Notification of Transmittal of the International Search Report and the Written Opinion of the International Searching Authority, or Declaration," Patent Cooperation Treaty, Oct. 4, 2024, 9 pages, International Application No. PCT/IB2024/056883.
Por et al., "UniSpaCh: A text-based data hiding method using Unicode space characters", The Journal of Systems & Software, vol. 85, May 2012, pp. 1075-1082.
"Exclusive: 'Half of school and college students are already using ChatGPT to cheat': Experts warn AI tech should strike fear in all academics", Dailymail.com, Mar. 26, 2023, 32 pages, doi: https://www.dailymail.co.uk/sciencetech/article-11899475/Half-students-using-ChatGPT-cheat-rise-90.html.
"Students are using ChatGPT to cheat. That's a challenge for teachers and school districts.", Marketplace, Feb. 8, 2023, 5 pages, doi: https://www.marketplace.org/episode/2023/02/08/students-are-using-chatgpt-to-cheat-thats-a-challenge-for-teachers-and-school-districts.

* cited by examiner

Title: The Marshall Plan of 1948: Rebuilding Europe and Shaping Its Future

Abstract: The Marshall Plan was an ambitious initiative to rebuild Europe after World War II, providing financial aid to Western European countries. The Plan not only helped to rebuild infrastructure and industries but also had significant political implications, promoting democracy, economic integration, and cooperation among European nations. This essay explores the impact of the Marshall Plan on Germany, France, and Spain and its legacy in modern Europe.

Background: Europe was devastated by World War II, with its infrastructure and industries in ruins, and its economies in shambles. The war had left Europe politically divided and economically weakened. The United States recognized the urgent need for help, and in 1948, the U.S. Congress passed the Economic Cooperation Act, commonly known as the Marshall Plan, providing financial aid to Western European countries.

Problem: The problem at hand was the reconstruction of Europe, but this was not just about rebuilding physical infrastructure; it was also about rebuilding the political and economic systems. The Marshall Plan aimed to achieve both goals by promoting democracy, economic integration, and cooperation among European nations.

Discussion:

Germany: Germany was one of the most devastated countries after World War II, with its infrastructure and industry in ruins. The Marshall Plan provided financial aid to Germany, which was critical in rebuilding its economy. By 1950, Germany's Gross Domestic Product (GDP) had increased by 35%, and its industry had returned to pre-war levels. The Marshall Plan also helped to promote democracy in Germany, which was critical in rebuilding its political system.

France: France was another country that received significant aid from the Marshall Plan. The aid helped to rebuild its infrastructure and industries, which were crucial in supporting the

Fig. 6

Title: The Marshall Plan of 1948: Rebuilding Europe and Shaping Its Future

Abstract: The Marshall Plan was an ambitious initiative to rebuild Europe after World War II, providing financial aid to Western European countries. The Plan not only helped to rebuild infrastructure and industries but also had significant political implications, promoting democracy, economic integration, and cooperation among European nations. This essay explores the impact of the Marshall Plan on Germany, France, and Spain and its legacy in modern Europe.

Background: Europe was devastated by World War II, with its infrastructure and industries in ruins, and its economies in shambles. The war had left Europe politically divided and economically weakened. The United States recognized the urgent need for help, and in 1948, the U.S. Congress passed the Economic Cooperation Act, commonly known as the Marshall Plan, providing financial aid to Western European countries.

Problem: The problem at hand was the reconstruction of Europe, but this was not just about rebuilding physical infrastructure; it was also about rebuilding the political and economic systems. The Marshall Plan aimed to achieve both goals by promoting democracy, economic integration, and cooperation among European nations.

Fig. 8

| Time-Line | RequestID | AnswerID | RequestBuffer | AnswerBuffer | RequestAnswer Type | ICString | Invisible Symbol Tag | ICInsertionPattern |
|---|---|---|---|---|---|---|---|---|
| Time-1 | NULL | NULL | NULL | NULL | NULL | NULL | NULL | NULL |
| Time-2 | R0001 | NULL | Why "Marshall Plan of 1948" is a the most import thing to build modern Europe political and economic? Can you use three examples from German, France, and Span to support your points? | NULL | NULL | NULL | NULL | NULL |
| Time-3 | R0001 | A0001 | Why "Marshall Plan of 1948" is a the most import thing to build modern Europe political and economic? Can you use three examples from German, France, and Span to support your points? | Abstract: The Marshall Plan was an ambitious initiative to rebuild Europe after World War II, providing financial aid to Western European countries. The Plan not only helped to rebuild... | Technical Creative Request | aichatbot | U+ 200C (UTF8+E080 8C) | Insert the invisible symbol tag into the front of relative first letter "A", "T", "C", "h", "a","T", "b","o","t" in the returned answer buffer. |
| Time-4 | R0001 | A0001 | Why "Marshall Plan of 1948" is a the most import thing to build modern Europe political and economic? Can you use three examples from German, France, and Span to support your points? | Abstract: The Marshall Plan was an ambitious initiative to rebuild Europe after World War II, providing financial aid to Western European Countries. The Plan not only helped to rebuild... | Technical Creative Request | aichatbot | U+ 200C (UTF8+E080 8C) | Insert the invisible symbol tag into the front of relative first letter "A", "T", "C", "h", "a","T", "b","o","t" in the returned answer buffer. |

Fig. 9

AI-GENERATED CONTENT DETECTION

BACKGROUND

Field of the Invention

This invention relates to artificial intelligence, and more specifically to systems and methods for detecting content that is generated by artificial intelligence.

Background of the Invention

Generative Artificial Intelligence (AI) has emerged as a groundbreaking technology with the ability to create original content, ranging from realistic images and music compositions to natural language text. Unlike traditional AI, which focuses on recognizing patterns and making decisions based on existing data, generative AI goes a step further to create entirely new content. However, its transformative and creative power also demands careful consideration of ethical implications and potential risks.

As the field of generative AI continues to evolve, collaboration between technologists, policymakers, and ethicists is important to establish guidelines and frameworks that ensure responsible AI development. With appropriate safeguards and ethical considerations, generative AI has vast potential to enhance creativity, innovation, and personalization across various sectors.

SUMMARY

The invention has been developed in response to the present state of the art and, in particular, in response to the problems and needs in the art that have not yet been fully solved by currently available systems and methods. Accordingly, systems and methods have been developed for detecting content generated by artificial intelligence. The features and advantages of the invention will become more fully apparent from the following description and appended claims, or may be learned by practice of the invention as set forth hereinafter.

Consistent with the foregoing, a method for detecting content generated by artificial intelligence is disclosed. In one embodiment, such a method includes monitoring interaction between a user and a generative AI model. The method intercepts a response returned from the generative AI model to the user and embeds, within the response prior to its return to the user, codes that are invisible to the user when viewing the response. In certain embodiments, these codes are embedded within the response in a particular invisible code insertion pattern to indicate that the response was generated by the generative AI model. The method returns the response to the user for viewing. A third party may utilize the embedded codes to determine whether the response was generated by the generative AI model.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which:

FIG. 6 is an exemplary block of text showing AI-generated content;

FIG. 8 shows the block of text from FIG. 7 once it has been analyzed for AI-generated content and shows one example of how an educator may be informed that it is AI-generated content; and FIG. 9 is a table showing various exemplary parameter values for a system and method configured to detect AI-generated content.

DETAILED DESCRIPTION

Figure 1:
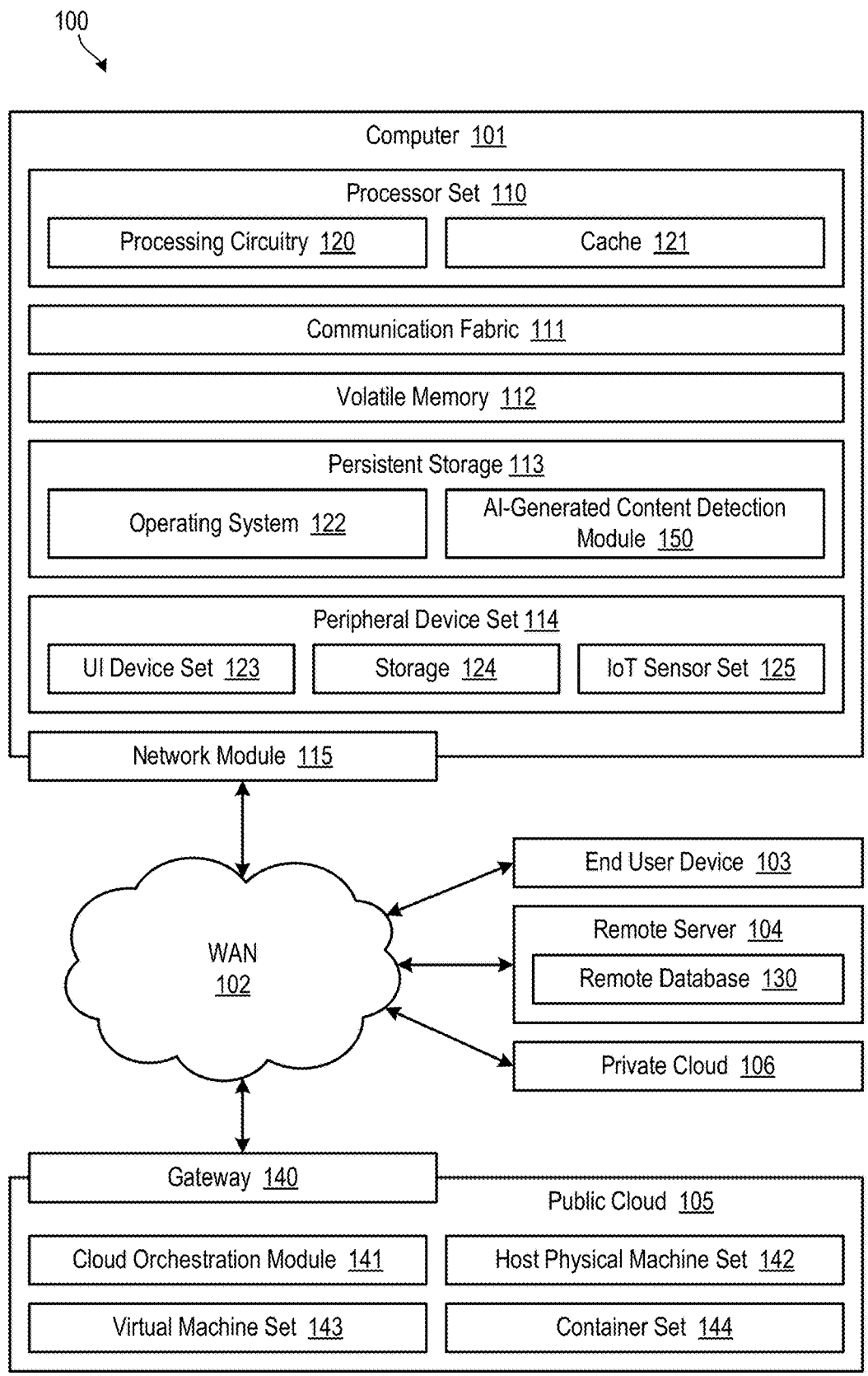
FIG. 1 is a high-level block diagram showing one example of a computing system for use in implementing embodiments of the invention.

Several examples will now be provided to further clarify various potential embodiments of the invention:

Example 1: A method for detecting content generated by artificial intelligence includes monitoring interaction between a user and a generative AI (artificial intelligence) model. The method intercepts a response returned from the generative AI model to the user and embeds, within the response prior to reception by the user, codes that are invisible to the user when viewing the response. The method returns the response to the user for viewing. A third party may utilize the codes embedded within the response in order to determine whether the response was generated by the generative AI model. These features have the technical effect and/or advantage of enabling a computing system to identify whether content is AI-generated content in a more efficient manner.

Example 2: The limitations of Example 1, further including identifying whether the response was generated in response to a technical creative request. This feature has the technical effect and/or advantage of only embedding the invisible codes in AI-generated content produced in response to certain types of requests, thereby increasing the efficiency of a computing system by reducing or eliminating unnecessary processing.

Example 3: The limitations of any of Examples 1-2, where embedding the codes further includes only embedding the codes if the response was generated in response to a technical creative request. This feature has the technical effect and/or advantage of only embedding the invisible codes in AI-generated content produced in response to certain types of requests, thereby increasing the efficiency of a computing system by reducing or eliminating unnecessary processing.

Example 4: The limitations of any of Examples 1-3, where the codes are selected from a same character encoding standard that is used to represent the response. This feature has the technical effect and/or advantage of using the same encoding scheme (e.g., Unicode encoding scheme) for both the invisible codes and the text of the response as opposed to using two different encoding schemes, thereby increasing the efficiency of a computing system by reducing or eliminating unnecessary processing.

Example 5: The limitations of any of Examples 1-4, further including analyzing the interaction as well as other similar interactions between the user and the generative AI model to establish a profile associated with the user. This feature has the technical effect and/or advantage of being able to identify types of users (e.g., students) that are requesting AI-generated content. This may eliminate or reduce the need to analyze the AI-generated content of users that are not of interest, thereby increasing the efficiency of a computing system by reducing or eliminating unnecessary processing.

Example 6: The limitations of any of Examples 1-5, where embedding the codes further includes embedding the codes within the response in a particular invisible code insertion pattern. This feature has the technical effect and/or advantage of further obfuscating and/or hiding invisible codes within the response as well as identifying whether the response contains AI-generated content. This may improve memory usage of a computing system by providing a space-efficient technique for marking AI-generated content.

Example 7: The limitations of any of Examples 1-6, further including using an augmented reality environment to determine whether the response was generated by the generative AI model. This feature has the technical effect and/or advantage of enabling a third party to quickly determine whether the response contains AI-generated content by overlaying identifying information onto the response. This may improve the function and utility of a computing system by providing another use for a computer-based augmented reality environment.

Example 8: A system including one or more processor and one or more computer-readable storage media collectively storing program instructions which, when executed by the processor, are configured to cause the processor to perform a method according to any of Examples 1-7. This feature has the technical effect and/or advantage of improving and/or specially programming a computing system to perform the method steps described above.

Example 9: A computer program product including one or more computer readable storage media, and program instructions collectively stored on the one or more computer readable storage media, the program instructions comprising instructions configured to cause one or more processors to perform a method according to any one of Examples 1-7. This feature has the technical effect and/or advantage of improving and/or specially programming a computer program product to perform the method steps described above.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code 150 (i.e., an "AI-generated content detection module 150") for detecting AI-generated content. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
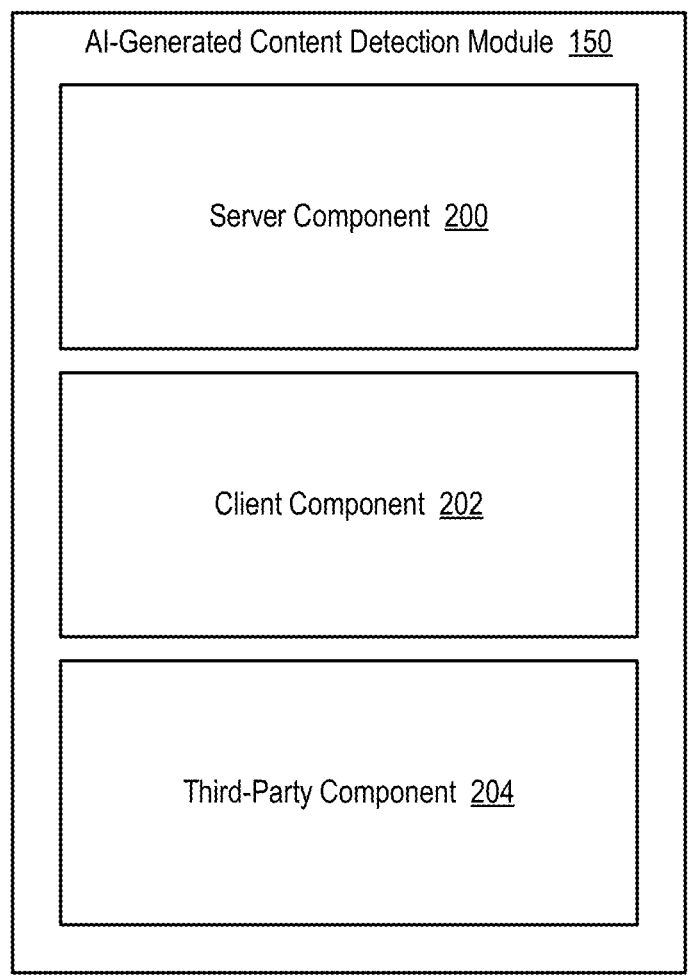
FIG. 2 is a high-level block diagram showing various sub-components that may be included within an AI-generated content detection module in accordance with the invention.

Referring to FIG. 2, as previously mentioned, generative artificial intelligence (AI) has emerged as a powerful technology capable of creating realistic and novel content across various domains. While generative AI holds immense potential for positive applications, there are concerns regarding its misuse and the potential for enabling dishonestly in academics such cheating on homework or other academic assignments.

For example, generative AI models, such as language models and text generators, can produce refined textual output based on given prompts. Such tools provide an avenue for students to quickly complete tasks such as homework without making any significant effort to understand the subject matter or complete the assignment. This undermines academic integrity, devalues the educational process, and creates an unfair advantage over students who uphold ethical practices.

The rapid advancement of generative AI poses challenges for institutions to effectively detect instances of cheating. Traditional plagiarism detection systems may struggle to identify content generated by AI models, especially if the generated content is not widely available in existing databases. This puts the onus on educational institutions to adopt more sophisticated detection methods to mitigate potential cheating.

To address the issues identified above, as well as potential issues with using AI-generated content in other non-academic settings, an AI-generated content detection module 150 may be provided. As the name implies, the AI-generated content detection module 150 may be configured to detect AI-generated content, such as AI-generated text or other content that is submitted in association with an academic assignment. This may provide a highly useful tool for educators or academic institutions to check or screen assignments or other work product for AI-generated content.

As shown, in certain embodiments, an AI-generated content detection module 150 in accordance with the invention includes one or more components 200-204, namely a server component 200, client component 202, and third-party component 204. The AI-generated content detection module 150 and associated components 200-204 may be implemented in hardware, software, firmware, or combinations thereof. As will be discussed in association with FIGS. 3, 4A, and 4B, the server component 200, client component 202, and third-party component 204 may include various sub-modules to provide various features and functions. These sub-modules are presented by way of example and not limitation. More or fewer sub-modules may be provided in different embodiments. For example, the functionality of some sub-modules may be combined into a single or smaller number of sub-modules, or the functionality of a single sub-module may be distributed across several sub-modules.

Figure 3:
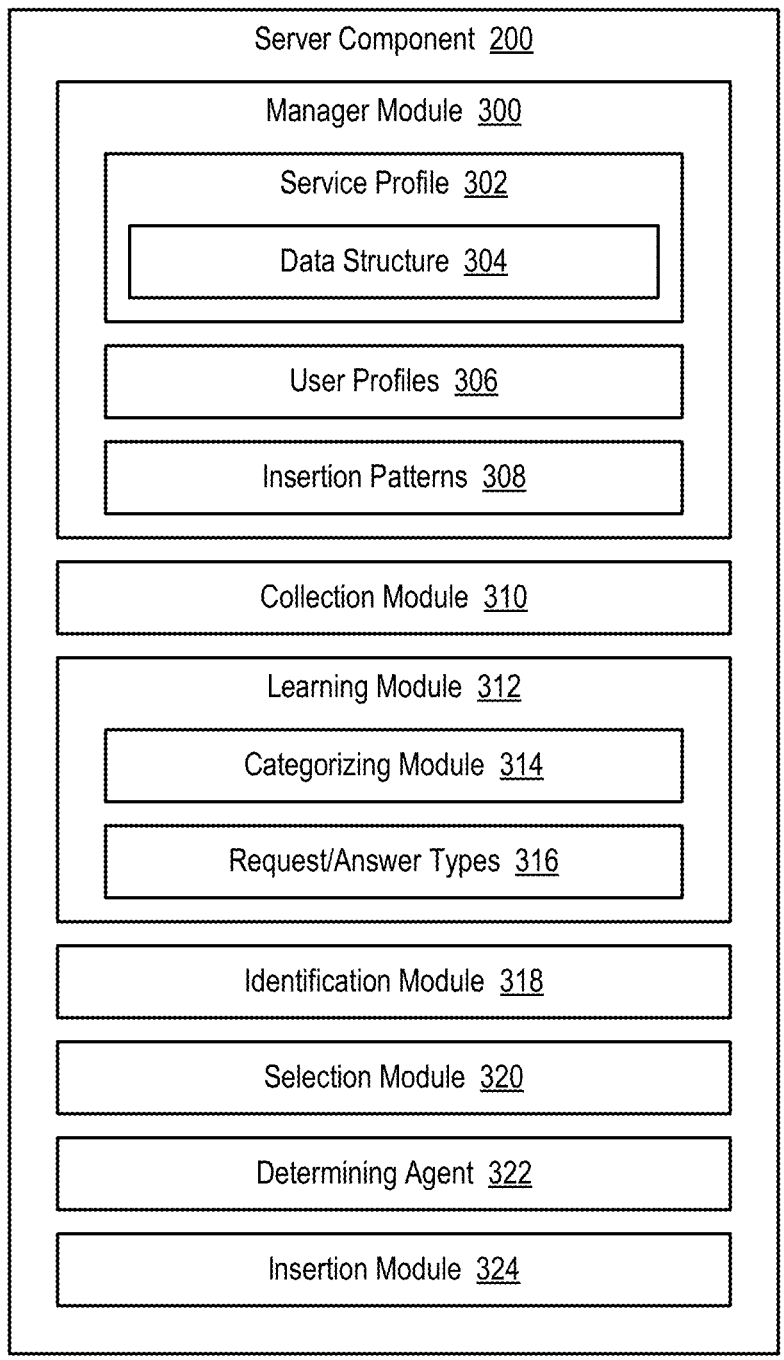
FIG. 3 is a high-level block diagram of a server component and various associated sub-modules.

Referring to FIG. 3, a high-level block diagram showing the server component 200 and various associated sub-modules is shown. As shown, in certain embodiments, the server component 200 includes one or more of a manager module 300, collection module 310, learning module 312, identification module 318, selection module 320, determining agent 322, and insertion module 324.

In certain embodiments, the manager module 300 provides a user interface for managing and configuring the AI-generated content detection module 150, defining a special data structure 304 associated with the AI-generated content detection module 150, adjusting and/or defining invisible code insertion patterns 308 (i.e., including invisible codes, etc.) for embedding in AI-generated content, as well as managing user profiles 306 associated with users that may be requesting AI-generated content. The manager module 300 may also enable administrators to define invisible code insertion patterns 308 for different request/answer types, as will be explained in more detail hereafter.

In certain embodiments, the data structure 304 is part of an overall service profile 302, which may be embodied as a configuration file that stores configuration settings for the AI-generated content detection module 150. The data structure 304 may store and maintain various different parameters or configuration settings in association with the AI-generated content detection module 150, such as request identifiers (RequestIDs), answer identifiers (AnswerIDs), request buffers (RequestBuffers), answer buffers (AnswerBuffers), request/answer types (RequestAnswerTypes), invisible code strings (ICStrings), invisible symbol tags, invisible code insertion patterns (ICInsertionPatterns), and the like. The purpose and function of these parameters or settings will be discussed in more detail in association with FIG. 9.

The collection module 310 may be configured to collect and analyze user requests and returned answers from a chatbot in order to determine user characteristics. These user characteristics may be stored in user profiles 306 as previously discussed. For example, when analyzing a user's requests to a chatbot and responses returned from the same, various creative requests and answers may be identified, and/or homework-assignment-related questions and answers may be detected using natural language processing. In such cases, the collection module 310 may classify the user as a "student."

The learning module 312 may, based on requests and answers processed by the chatbot, learn different request/answer types (e.g., information/fact; fun; personal advice and opinion, technical creative requests, etc.). The learning module 312 may, in certain embodiments, include a categorizing module 314 to categorize different requests in real time and update/merge/create different request/answer types 316.

The identification module 318 may be configured to identify request-answer types in real time. For example, a request-answer pair "Who is the first president of the USA?" and "The first President of the United States of America was George Washington. He served as the nation's first president from 1789 to 1797" may be identified by the identification module 318 as belonging to the "information/fact" request/answer type 316. Similarly, a refined or translated resume may be identified as the "personal advice and opinion" request/answer type 316 by recognizing personal information related to name, email address, phone number, etc. In a similar manner, a generated paper/article may be identified as a "technical creative request" request/answer type 316 due to its format (title, abstract, discussion, conclusion, references, etc.).

The selection module 320 may select an invisible code insertion pattern 308 (i.e., invisible codes, etc.) to embed in an answer based on the type 316 that was determined for the request/answer. For example, in certain embodiments, no invisible code insertion pattern 308 may be used for request/answer types 316 "information/fact" and "personal advice and opinion" whereas a selected invisible code insertion pattern 308 may be used for the "technical creative request" request/answer type 316 since there is a high probability that it relates to an academic assignment or work product.

Once an invisible code insertion pattern 308 is selected, the determining agent 322 may, assuming the answer from the chatbot is in text format, determine letters in the text for placement of the embedded codes of the invisible code insertion pattern 308. One example of how this may be performed will be discussed in association with FIGS. 6 through 9. Once the letters are determined, the insertion module 324 may insert the codes of the invisible code insertion pattern 308 into the text of the answer. The answer may then be returned to the user, and more specifically to the client component 202, with the invisible codes embedded therein.

Figure 4A:
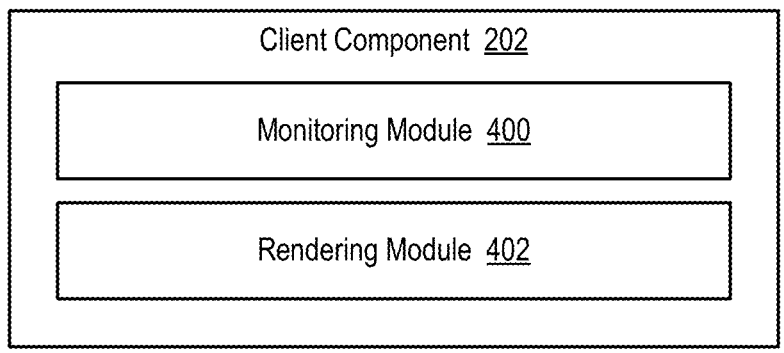
FIG. 4A is a high-level block diagram of a client component and various associated sub-modules.

Referring to FIG. 4A, a high-level block diagram of the client component 202 and associated sub-modules is illustrated. In general, the client component 202 may be a client application that adds/installs an extra layer (e.g., a plug-in, add-on, extension, proxy server, etc.) between an AI chatbot server and an AI chatbot client. In certain embodiments, the client component 202 includes a monitoring module 400 for monitoring human and computer interactions associated with an AI chatbot (e.g., ChatGPT) in real time. More specifically, the monitoring module 400 may monitor requests from users and answers generated by the chatbot and enable the server component 200 to intercede in these interactions to embed invisible code insertion patterns 308 if needed. Once invisible code insertion patterns 308 are embedded in an answer, the rendering module 402 may render the chatbot answer for viewing by the user.

The third-party component 204 may enable a third party such as a teacher, professor, administrator, or other educator to check an academic assignment or other work product for AI-generated content. In certain embodiments, the third-party component 204 includes a validation module 404 for determining the validity of an assignment or other work product (i.e., determine whether the assignment or other work product was created by a student or created using AI-generated content). In certain embodiments, the third-party component 204 may also include a display module 406 to visually display, using the invisible codes, whether the assignment or work product contains AI-generated content. In certain embodiments, this may occur in an augmented reality environment. One way this may accomplished will be discussed in association with FIG. 8.

Although the user 512 described herein may be a student, the user 512 is not limited to a student and may include any individual, organization, or entity that produces or requests the production of AI-generated content in any context. Similarly, the third party is not limited to an educator 514 but may include any individual, organization, or entity that has an interest in discovering or knowing whether content has been generated by artificial intelligence. Thus, any reference herein to a student or educator is simply exemplary and not intended to be limiting.

Figure 4B:
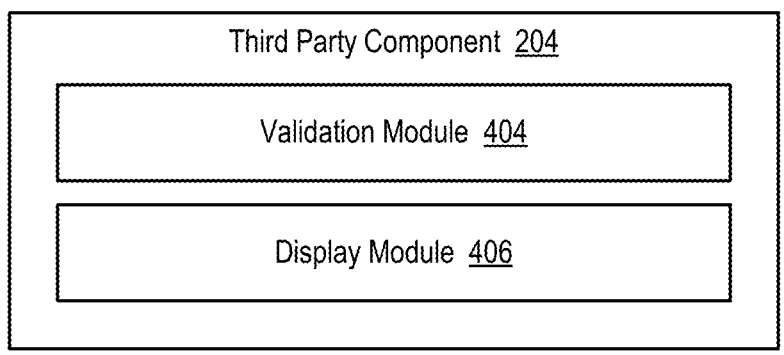
FIG. 4B is a high-level block diagram of a third party component and various associated sub-modules.
Figure 5:
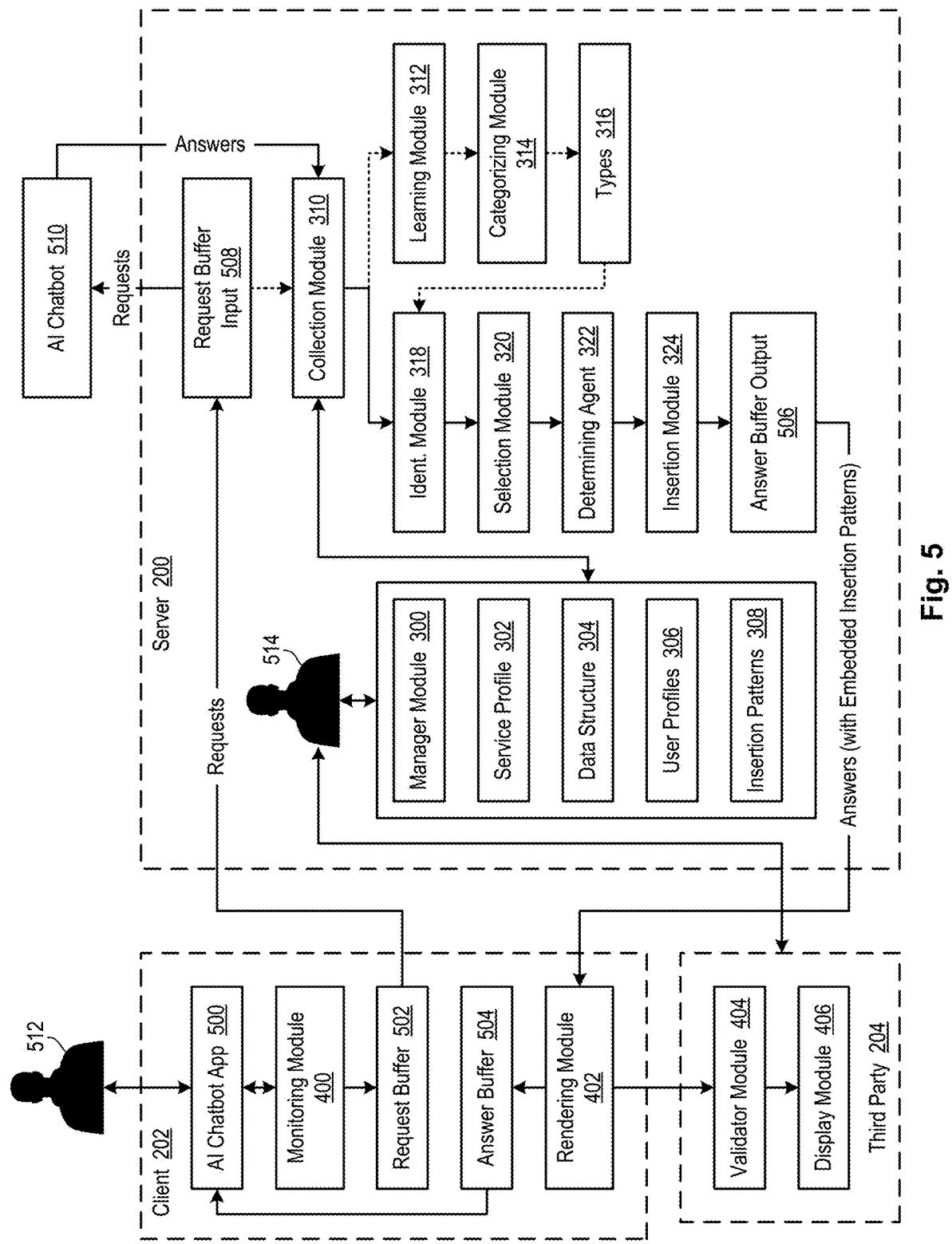
FIG. 5 is a process flow diagram showing interaction between the modules described in association FIGS. 3 through 4B.

Referring to FIG. 5, a process flow diagram showing interaction between the modules described in association FIGS. 3 through 4B is illustrated. As shown, the monitoring module 400 monitors a user's interactions with an AI chatbot 500 (e.g., ChatGPT) in real time. More specifically, the monitoring module 400 may monitor for incoming requests to a request buffer 502. The contents of this request buffer 502 may be transmitted to a request buffer input 508 associated with the server component 200. There, the requests may be forwarded to the AI chatbot 510 to generate answers. The requests are analyzed by the collection module 310 to determine user characteristics associated with the requests. The collection module 310 may store these user characteristics in the user profiles 306 previously discussed.

As further shown in FIG. 5, answers may be returned by the AI chatbot 510 to the server component 200. As shown, the learning module 312 may analyze the requests and answers processed by the chatbot 510 to learn different request/answer types 316. The categorizing module 314 may categorize different requests and answers in real time to update/merge/create the request/answer types 316.

The identification module 318 may be configured to identify request-answer types 316 in real time and the selection module 320 may select an invisible code insertion pattern 308 to embed in the answers based on the types 316. The determining agent 322 may determine letters (or other locations) in the text for placement of the invisible codes of the invisible code insertion pattern 308, and the insertion module 324 may insert the codes of the invisible code insertion pattern 308 into the text of the answer at or near these locations. An answer buffer output 506 may receive the answer with the embedded invisible codes. This answer may be returned to the client component 202 where it may rendered for viewing by the user 512. The invisible codes will not be visible to the user 512 but may nevertheless remain embedded in and travel with the text of the answer.

Within the third-party component 204 (which may in selected embodiments be part of the client component 202), the validation module 404 may check the answer (or an assignment or work product containing all or part of the answer) for the invisible codes to determine whether the content includes AI-generated content. The display module 406 may be used to visually display, such as in augmented reality, visual indicators (highlighted letters or text for example) that may indicate that the content contains AI-generated content. In certain embodiments, the functionality associated with the third-party component 204 is only made accessible to educators 514 such as teachers, professors, or administrators.

As further shown in FIG. 5, educators 514 such as teachers, professors, or administrators may also have access to the user interface associated with the manager module 300. This may enable the educator 514 to configure one or more of the service profile 302, data structure 304, user profiles 306, invisible code insertion patterns 308, or the like, for operation of the AI-generated content detection module 150.

Figure 7:
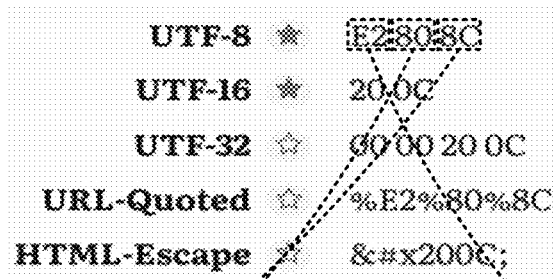
FIG. 7 shows a binary format for the block of text shown in FIG. 6 as well as various invisible codes that may be embedded within the block of text.

FIG. 6 is an exemplary block of text showing content that may be generated by a chatbot in response to a "technical creative request" from a user 512. This block of text may contain embedded invisible codes and may represent what a user 512 may see. FIG. 7 shows a binary format for the block of text shown in FIG. 6 as well as various codes that may be inserted therein. In the illustrated example, the text block characters are represented using the UTF-8 (Unicode Transformation Format, 8-bit) encoding scheme. UTF-8 includes some "zero width" codes or characters that have no visible or significant width when displayed. They do not occupy any physical space or alter the layout of text when rendered. In certain embodiments, these "zero width" characters may be used as the "invisible codes" previously discussed since they will not be visible to a user.

For example, in the UTF-8 encoding scheme, the hexadecimal data code "e2808c" is a zero width character that is invisible when a text block is displayed. This code may be inserted at selected points in the text block to indicate that the text block contains AI-generated content, as shown in FIG. 7. For example, in one embodiment, in order to indicate that a text block contains AI-generated content, the AI-generated content detection module 150 may parse the text block for words that begin with the letters "a", "i", "c", "h", "a" "t", "b", "o", and "t" (or the upper case versions of these letters) and insert the above-described invisible code before these letters.

For example, FIG. 7 shows the invisible code "e2808c" inserted before the hexadecimal code "41", which is the letter "A" in the UTF-8 encoding scheme (in the little-endian architecture as "e20a, 8c80, 6241"). UTF-8 is one of several Unicode encoding schemes, so "e2808c" as one zero width character will show up coherently. The content shown in FIG. 7 was produced with a system having little-endian architecture and thus the byte order is swapped (e.g., "Ab" (x41x62) will be swapped as "bA" (x62x41)). If a system having big-endian architecture is used, the code "e2808c" may be displayed in normal human eyes compliant order: "0ae2, 808c, 4162".

When the text block is processed by the validation module 404 and/or display module 406 previously described for viewing by an educator 514, the text block may be displayed in the manner shown in FIG. 8 with the first letters of words highlighted to spell "aichatbot." This may indicate to an educator 514 that the text block contains AI-generated content. This represents just one type of invisible code insertion pattern 308 and way of showing an educator 514 that a text block or other work product contains AI-generated content and is not intended to be limiting. Many other ways of showing the presence of AI-generated content using the invisible code insertion patterns 308 and associated invisible codes described herein are possible and within the scope of the invention.

Referring to FIG. 9, as previous mentioned, the data structure 304 may store and maintain various different parameters or configuration settings in association with the AI-generated content detection module 150, such as a request identifier (RequestID), answer identifier (AnswerID), request buffer 502 (RequestBuffer), answer buffer 504 (AnswerBuffer), request/answer type 316 (RequestAnswerType), invisible code string (ICString), invisible symbol tag, invisible code insertion pattern 308 (ICInsertionPattern), and the like. FIG. 9 is a table showing exemplary values for these parameters at times Time-1, Time-2, Time-3, and Time-4 when processing a request and answer with a chatbot, such as the example discussed in association with FIGS. 6 through 8.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method comprising:
monitoring interaction between a user and a generative AI (artificial intelligence) model;
intercepting a response returned from the generative AI model to the user;
embedding, within the response prior to reception by the user, codes that are invisible to the user when viewing the response, wherein the codes comprise zero width characters that occupy no display space when rendered, and wherein embedding the codes comprises inserting the zero width characters into text of the response according to an invisible code insertion pattern;
returning the response to the user for viewing; and
utilizing, by a third party, the codes embedded within the response in order to determine whether the response was generated by the generative AI model.

2. The method of claim 1, further comprising identifying whether the response was generated in response to a technical creative request, and wherein embedding the codes further comprises only embedding the codes in response to identifying that the response was generated in response to the technical creative request.

3. The method of claim 1, wherein the codes are selected from a same character encoding standard that is used to represent the response.

4. The method of claim 1, further comprising analyzing the interaction as well as other similar interactions between the user and the generative AI model to establish a profile associated with the user.

5. The method of claim 1, wherein embedding the codes further comprises embedding the codes within the response in a particular invisible code insertion pattern.

6. The method of claim 1, further comprising using an augmented reality environment to determine whether the response was generated by the generative AI model.

7. The method of claim 1, wherein the codes that comprise the zero width characters are of a Unicode Transformation Format, 8-bit (UTF-8) encoding scheme.

8. The method of claim 7, wherein the codes comprise UTF-8 hexadecimal code e2808c.

9. The method of claim 1, wherein the invisible code insertion pattern inserts the zero width characters into the text at locations corresponding to selected letters of the text.

10. A computer program product comprising a computer-readable storage medium having computer-usable program code embodied therein, the computer-usable program code configured to perform the following when executed by at least one processor:
monitor interaction between a user and a generative AI model;
intercept a response returned from the generative AI model to the user;
embed, within the response prior to reception by the user, codes that are invisible to the user when viewing the response, wherein the codes comprise zero width characters that occupy no display space when rendered, and wherein embedding the codes comprises inserting the zero width characters into text of the response according to an invisible code insertion pattern;
return the response to the user for viewing; and
utilize, by a third party, the codes embedded within the response in order to determine whether the response was generated by the generative AI model.

11. The computer program product of claim 10, wherein the computer-usable program code is further configured to identify whether the response was generated in response to a technical creative request, and wherein embedding the codes further comprises only embedding the codes in response to identifying that the response was generated in response to the technical creative request.

12. The computer program product of claim 10, wherein the codes are selected from a same character encoding standard that is used to represent the response.

13. The computer program product of claim 10, wherein the computer-usable program code is further configured to analyze the interaction as well as other similar interactions between the user and the generative AI model to establish a profile associated with the user.

14. The computer program product of claim 10, wherein embedding the codes further comprises embedding the codes within the response in a particular invisible code insertion pattern.

15. The computer program product of claim 10, wherein the computer-usable program code is further configured to use an augmented reality environment to determine whether the response was generated by the generative AI model.

16. A system comprising:
at least one processor; and
at least one memory device operably coupled to the at least one processor and storing instructions for execution on the at least one processor, the instructions causing the at least one processor to:
monitor interaction between a user and a generative AI model;
intercept a response returned from the generative AI model to the user;
embed, within the response prior to reception by the user, codes that are invisible to the user when viewing the response, wherein the codes comprise zero width characters that occupy no display space when rendered, and wherein embedding the codes comprises inserting the zero width characters into text of the response according to an invisible code insertion pattern;

return the response to the user for viewing; and utilize, by a third party, the codes embedded within the response in order to determine whether the response was generated by the generative AI model.

17. The system of claim 16, wherein the instructions further cause the at least one processor to identify whether the response was generated in response to a technical creative request, and wherein embedding the codes further comprises only embedding the codes in response to identifying that the response was generated in response to the technical creative request.

18. The system of claim 16, wherein the codes are selected from a same character encoding standard that is used to represent the response.

19. The system of claim 16, wherein embedding the codes further comprises embedding the codes within the response in a particular invisible code insertion pattern.

20. The system of claim 19, wherein the instructions further cause the at least one processor to use an augmented reality environment to determine whether the response was generated by the generative AI model.

* * * * *